E. Smith,
Mower.
No. 34,219 Patented Jan. 21, 1862.
Fig. 1.
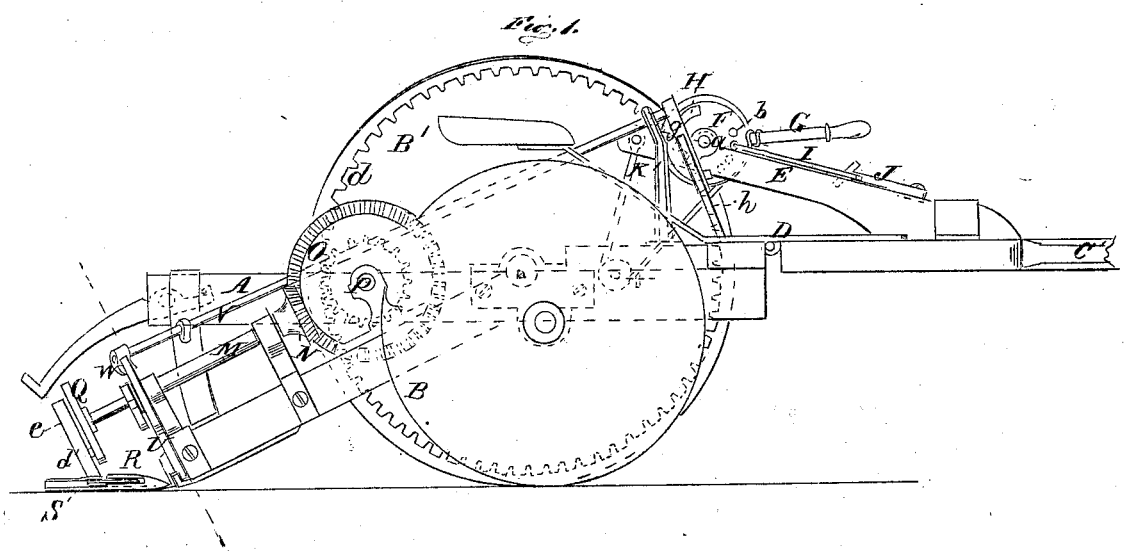
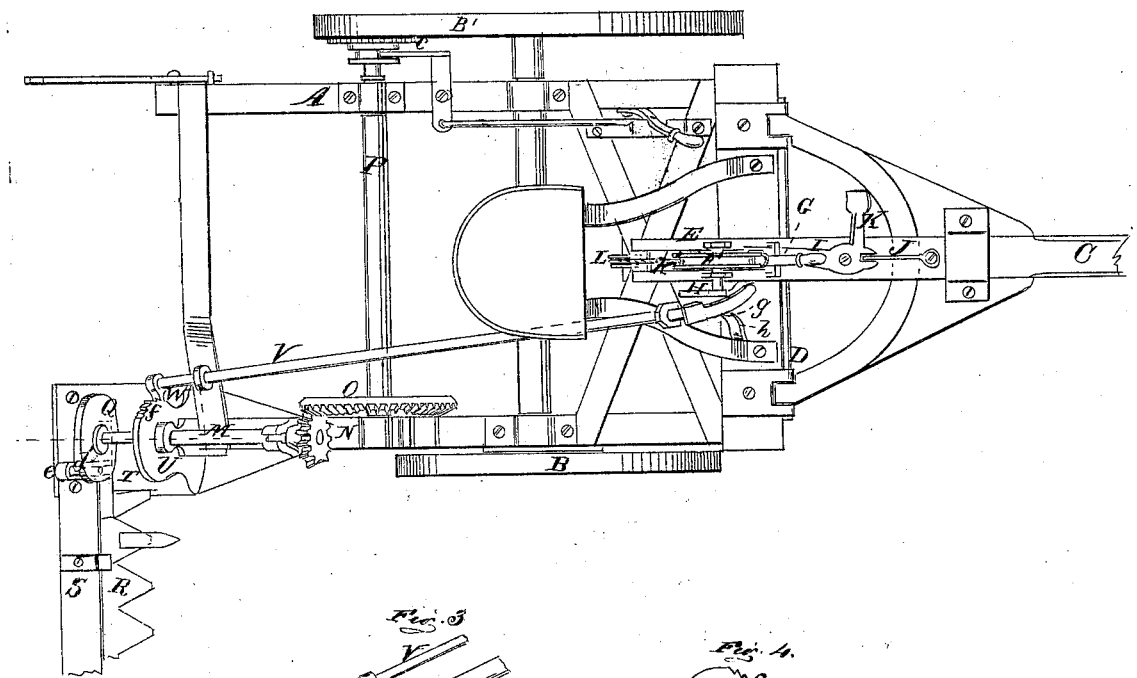
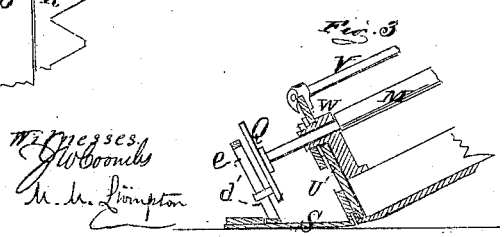
Fig. 3.
Fig. 4.
Witnesses
J. W. Coombs
M. M. Thompson
Inventor
E. Smith
per Munn & Co.
Attorneys

UNITED STATES PATENT OFFICE.

E. SMITH, OF COLD SPRING HARBOR, NEW YORK.

IMPROVEMENT IN HARVESTERS.

Specification forming part of Letters Patent No. 34,219, dated January 21, 1862.

*To all whom it may concern:*

Be it known that I, E. SMITH, of Cold Spring Harbor, in the county of Suffolk and State of New York, have invented a new and useful Improvement in Grain and Grass Harvesters; and I do hereby declare that the following is a full, clear, and exact description of the same, reference being had to the accompanying drawings, making a part of this specification, in which—

Figure 1 is a side view of my invention; Fig. 2, a plan or top view of the same; Fig. 3, a detached section of a portion of the same taken in the line $x\,x$, Fig. 2; Fig. 4, a detached section of the same taken in the line $y\,y$, Fig. 1.

Similar letters of reference indicate corresponding parts in the several figures.

This invention relates to a new and improved means employed for elevating the sickle, whereby the same may be raised bodily in a horizontal position, so as to pass over obstructions which may lie in its path, and the sickle at the same time admit of being so arranged as to work or turn on a shaft attached to the main frame of the machine, said shaft forming the only attachment of the sickle to the main frame.

The invention consists in using, in connection with a cord and pulley arranged to actuate or adjust the main frame of the machine, a pawl and segment-rack, arranged as hereinafter shown and described, whereby the sickle is held in a horizontal rigid state as the main frame is actuated and its back part elevated and the desired result thereby attained.

To enable those skilled in the art to fully understand and construct my invention, I will proceed to describe it.

A represents the main frame of the machine, which is supported by the wheels B B', the latter wheel, B', being the one from which the power is taken.

C is the draft-pole, which is attached to the main frame A by a joint or hinge, D; and E is an arm, which is secured longitudinally to the back part of the draft-pole in an inclined position, as shown in Fig. 1, said arm projecting over the front part of the main frame A.

In the back part of the arm E there is fitted or placed a pulley, F, having a handle or lever, G, attached, and to one end of the axis $a$ of the pulley F there is attached a cam, H, which may be described as being of semicircular form and bent or curved laterally, as shown clearly in Fig. 2. The pulley F is perforated near its edge, as shown at $b$, and into any of the perforations one end of a lever, I, fits and retains the pulley, or prevents it from casually moving, a spring, J, having a tendency to keep the lever I in the holes $b$. (See Fig. 2.) The lever I is provided with a projecting arm, K, which serves as a foot-piece through which the lever may be thrown free from the pulley F by the foot of the driver.

To the pulley F there is secured one end of a chain or cord, K', said chain or cord passing around a pulley, L, which is attached to the front part of the main frame A, and, extending upward, is secured to the back part of the arm E, as shown clearly in Fig. 1.

On the back part of the main frame A, at the right-hand side, there is placed longitudinally a shaft, M, at the front end of which there is a pinion, N. The pinion N gears into a bevel-wheel, O, which is on a shaft, P, the latter being driven from the wheel B' by means of a pinion, $c$, and a toothed rim, $d$, on wheel B'. On the back part of the shaft M there is placed a crank-pulley, Q, the pin $d'$ of which fits in an upright loop or yoke, $e$, attached to the sickle R.

The sickle R is fitted on a finger-bar, S, in the usual way, and the finger-bar is attached at its inner end to a plate, T, and the front end of plate T has a plate, U, secured to it in an inclined position, the plate U being fitted loosely on the shaft M, so that it may be freely turned thereon. The upper part of the plate U is of circular form, and its inner edge is serrated or toothed, as shown at $f$. (See Figs. 2 and 4.)

V is a shaft, which is placed longitudinally in suitable bearings on the main frame A. To the back end of the shaft V there is attached a pawl, W, which pawl is in line with or directly opposite to the serrated edge $f$ of the plate U. To the front end of the shaft V there is attached a pendent arm, $g$, against which a spring, $h$, bears, said spring having a tendency to keep the pawl W out or free from the serrated edge $f$ of plate U. The arm $g$ is directly opposite the cam H.

The operation is as follows: As the machine is drawn along, the finger-bar S rests on the ground, the sickle R being driven by the mechanism previously described. The back part of the main frame A may be elevated at any time by drawing back the lever or handle G of the pulley F. As the lever or handle G is drawn back, the cam H acts against the pendent arm G, and thereby turns the shaft V and throws the pawl W in gear with the serrated edge $f$ of the plate U, and the finger-bar S will consequently be held rigidly in position and horizontally, so as to rise bodily with the back part of the main frame A. If the pawl W and serrated plate U were not employed, the inner end of the finger-bar and sickle would rise with the back part of the main frame, but the outer end would rest on the ground in consequence of the plate U being fitted loosely on the shaft M. The pawl and serrated plate arrangement is therefore very important, and it will be seen that the pawl W is actuated automatically by the movement of the pulley F, so that the pawl W will engage with the serrated plate U simultaneously with the rising of the back part of the main frame A. The back part of the main frame and the finger-bar and sickle may be allowed to descend at any time by throwing the lever I free from the pulley F, the lever I being thus actuated by the foot of the driver, as previously alluded to.

Having thus described my invention, what I claim as new, and desire to secure by Letters Patent, is—

1. The pawl W, actuated from the pulley F, substantially as shown, in connection with the plate U, provided with the serrated edge $f$, and fitted on the shaft M, all being arranged to operate as and for the purpose set forth.

2. In combination with the pawl W and serrated plate U, arranged as shown, the pulley F, connected with the main frame A by the cord or chain K, cam H, and lever I, the pulley, cam, and lever being attached to the draft-pole C, and all arranged substantially as and for the purpose specified.

E. SMITH.

Witnesses:
HIRAM L. LEWIS,
WM. W. WOOD.